United States Patent [19]

Holman

[11] 3,811,066

[45] May 14, 1974

[54] TELEVISION CAMERA COMPRISING AN INTERFERENCE-FREE MESH CONNECTION CONDUCTOR

[75] Inventor: Benedictus Timotheus Johannes Holman, Emmasingel, Eindhoven, Netherlands

[73] Assignee: U.S. Philips Corporation, New York, N.Y.

[22] Filed: Jan. 5, 1973

[21] Appl. No.: 320,962

[30] Foreign Application Priority Data

Jan. 28, 1972 Netherlands ........................ 7201226

[52] U.S. Cl. .................. 315/10, 313/82 T, 335/213

[51] Int. Cl. .............................................. H01j 31/26

[58] Field of Search ........... 315/8, 10; 313/65, 82 T; 335/213

[56] References Cited

UNITED STATES PATENTS 3,153,171 10/1964 Poole et al. ............................ 315/8

3,286,121 11/1966 Lubszynski ............................ 315/8

3,349,271 10/1967 Harkensee ......................... 315/8 X

*Primary Examiner*—Benjamin R. Padgett

*Assistant Examiner*—P. A. Nelson

*Attorney, Agent, or Firm*—Frank R. Trifari; Carl P. Steinhauser

[57] ABSTRACT

In order to suppress interference signals caused by the line deflection field across the capacitive interruption between the mesh electrode and the target, the mesh connection loop of a television camera having a separated mesh electrode is constructed such that effectively it encloses substantially no magnetic flux of the line deflection field. The return field which is usually concentrated in the wall of a ferromagnetic screening bush mounted about the camera tube is taken into account in this respect. In a preferred embodiment, the mesh connection wire in the camera tube has the shape of a helix having a pitch which corresponds to the axial field length of the line deflection field.

17 Claims, 15 Drawing Figures

TELEVISION CAMERA COMPRISING AN INTERFERENCE-FREE MESH CONNECTION CONDUCTOR

Figure 1:
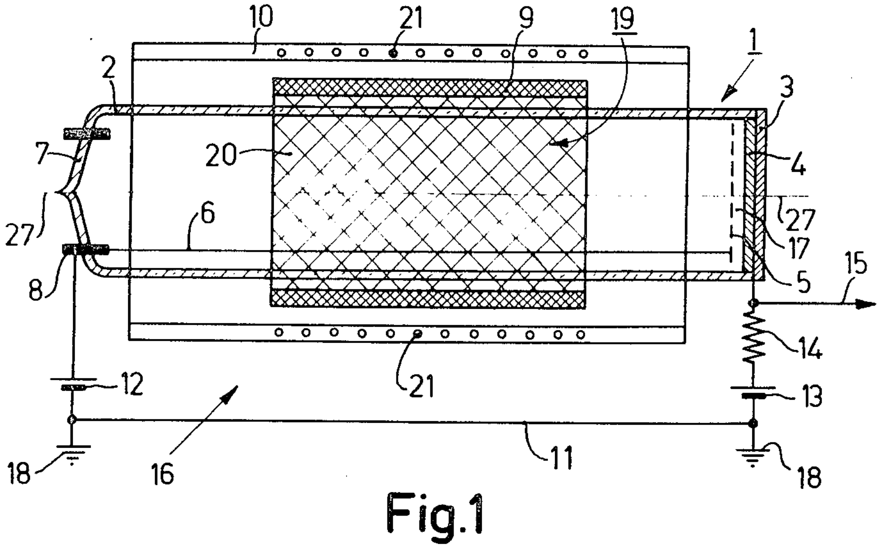

The invention relates to a television camera comprising an electromagnetic scanning system, a television camera tube which is to be incorporated in this system and which comprises a target to be scanned by an electron beam and a mesh electrode situated near the target, the said television camera comprising a connection loop so as to apply a direct voltage between the electrode and the target, the said mesh connection loop comprising a conductor which is arranged inside the camera tube and a conductor which is arranged outside the camera tube.

A television camera of this kind is known from U.S. Pat. No. 3,286,121. In a television camera tube described therein use is made, in order to reduce interference voltages originating from the line deflection field, of a known, single, straight wire in a multiple design, *i.e.* pairs of wires which are diametrically arranged in the tube. In the said patent application it is noted that the cause, even though not quite clear and not yet fully understood, lies in the induction of voltages by the deflection fields *via* the conductor. By means of these multiple wires an improvement is obtained with respect to the single-wire connection. However, the construction has some drawbacks which become significant particularly in television cameras of the commonly used three-tube type. In such a colour camera the superimposition of the constituent colour images cannot always be optimally realized. The deviations are caused *inter alia* in that comparatively high currents can be generated in the loop or loops formed by the wires. The currents introduce a magnetic field which influences the deflection of the electron beam, so that deviations occur in the scanning pattern of the television camera tube. These interference signals can be counteracted only by the choice of a given angular orientation of the wire loop in the line deflection field. The use of a plurality of loops results in a comparatively complex construction.

The invention has for its object to provide a television camera in which all interference voltages in the video signal which are caused by a line deflection field are eliminated, if desired, independent of the orientation of the camera tube in the scanning field. According to the invention a television camera of the kind set forth is characterized in that the mesh connection loop incorporates constructions such that the appearance of interference voltages, caused by the line deflection field, between the mesh electrode and the target is avoided, and the appearance of disturbing induction currents in the mesh connection conductor is prevented.

The invention is based on a better insight of the inventor into the causes of the appearance of the relevant interference signals. The fact that known television cameras comprise a ferromagnetic screening member which is mounted about the coil system must be taken into account in this respect. The wall of this screening member is also enclosed by a connection loop for the mesh electrode. This is because the mesh supply conductor of the connection loop — to be understood to mean hereinafter as a part of the mesh connection loop which is situated outside the camera tube — is situated outside the screening member. In many television cameras the mesh supply conductor not only comprises voltage sources for the mesh electrode and the target, but also a signal resistor and the mass of the camera. The mesh connection conductor — a part of the mesh connection loop which is situated inside the camera tube — is situated inside the screening member.

Consequently, for determining the magnetic field enclosed by the mesh connection loop not only the line deflection field itself must be taken into account, but also the field occurring in the wall of the ferromagnetic screening member. Rapid flux variations, occurring particularly in the line deflection field enclosed by the mesh connection loop, will cause interference voltages across the interruption between the mesh electrode and the target in the mesh connection loop. Consequently, *via* the mesh electrode/target capacitance an interference current arises which has a repetition frequency corresponding to the line deflection field, and which is added to a video signal derived from the target. According to the invention these interference signals are suppressed without currents disturbing the deflection field being induced in the mesh connection conductor.

As the cause of the interference signals is now properly recognized, various preferred embodiments can be given for reducing the interference signals. In a first group of preferred embodiments to be described the surface of the mesh connection loop is made to be small. As a result, the flux enclosed by the mesh connection loop is small. It must then be prevented in particular that the loop is enclosed by the wall of a screening member, if any. Because the construction of the mesh connection conductor in the camera tube according to this embodiment does not deviate or deviates only slightly from known constructions, this preferred embodiment can be applied in known cameras.

A further group of preferred embodiments notably comprises improvements of the said double-wire connection. While maintaining all advantages of the double-wire connection, the said drawbacks are eliminated therein.

In a more sophisticated group of preferred embodiments the requirements imposed are satisfied, in particular by the construction of the mesh connection conductor. Consequently, known camera tubes cannot be used for this purpose, but the known camera tubes can often be readily replaced by camera tubes according to one of these preferred embodiments. This group comprises preferred embodiments in which all interference signals are suppressed by means of a simple construction of the mesh connection conductor. This suppression is notably independent of the angular or axial position of the camera tube in the deflection field.

Figures 2, 3:
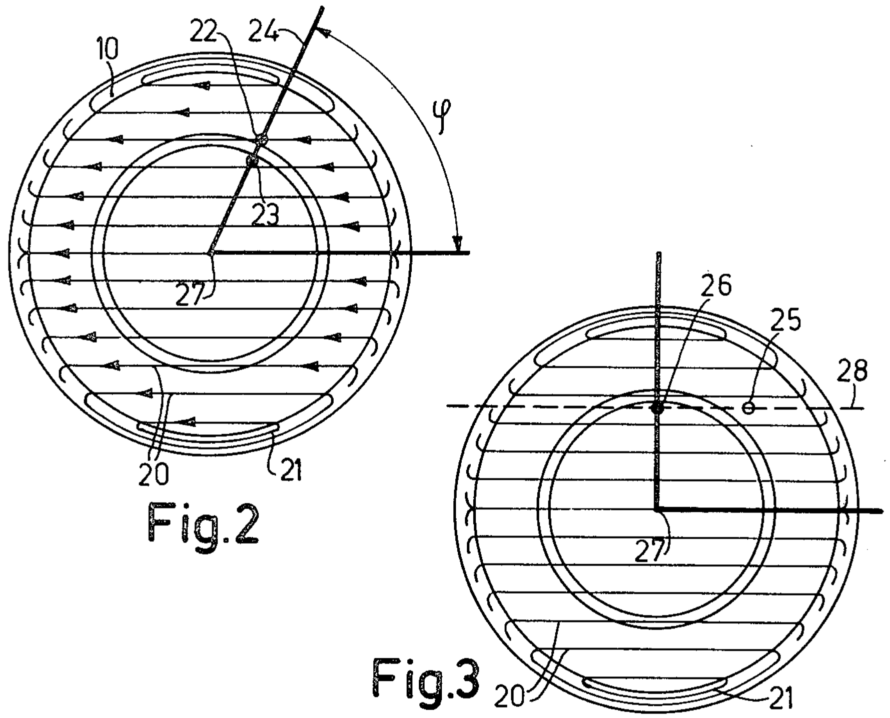
Figure 4:
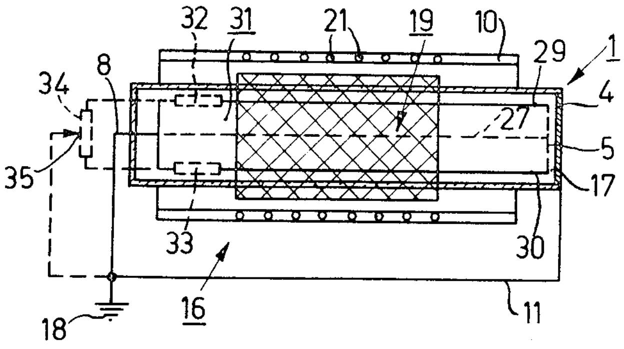
Figure 5:
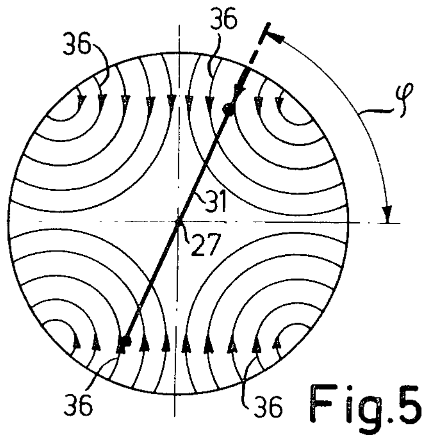
Figure 6:
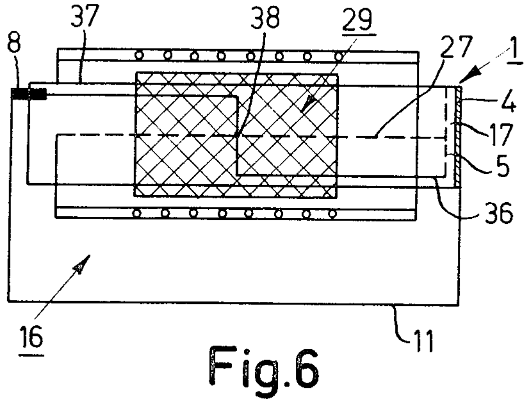
Figures 10, 11, 12:
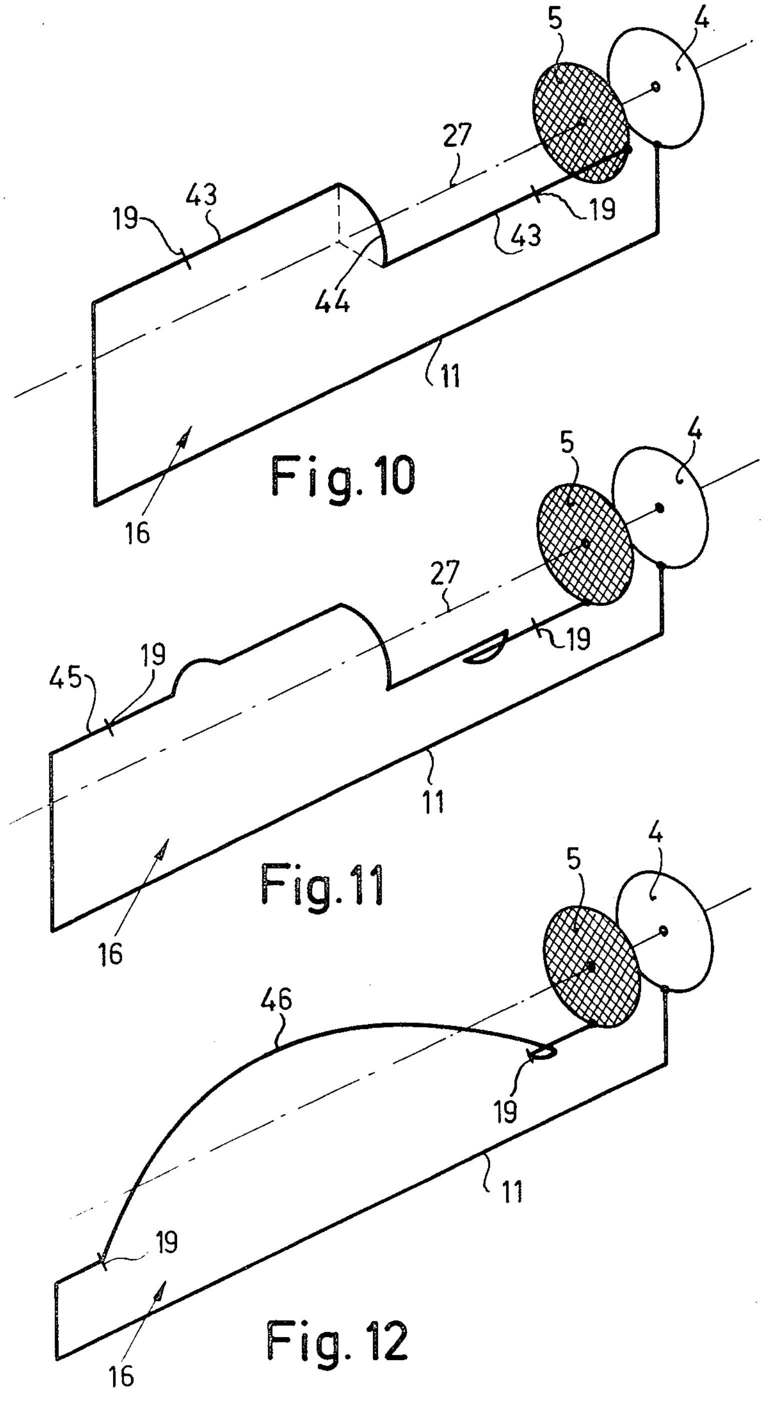
Figures 13, 14:
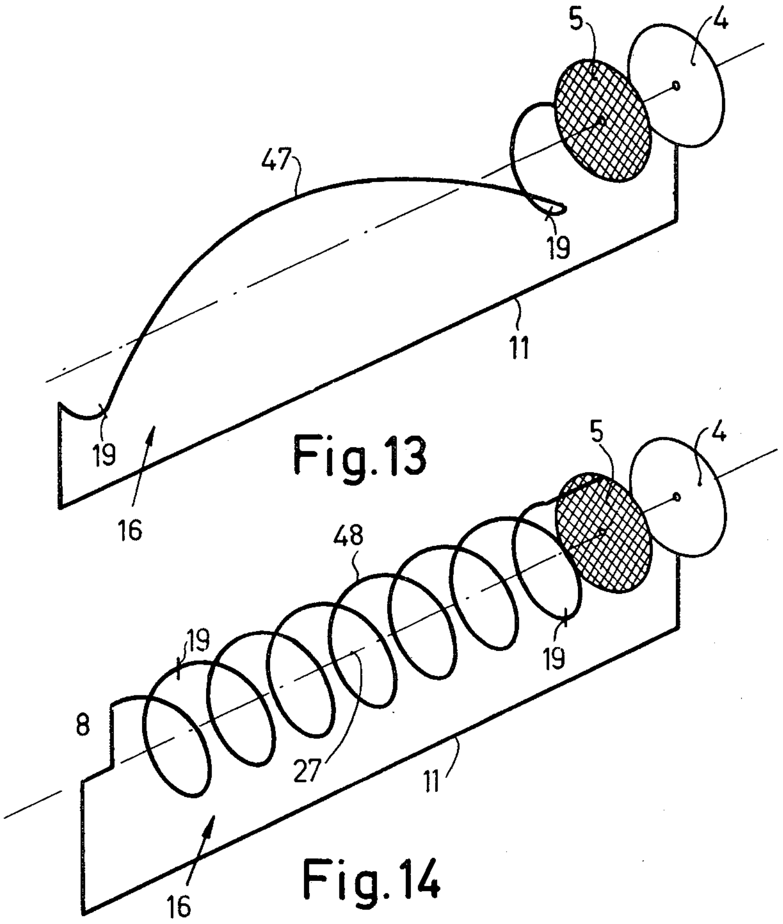
Figure 15:
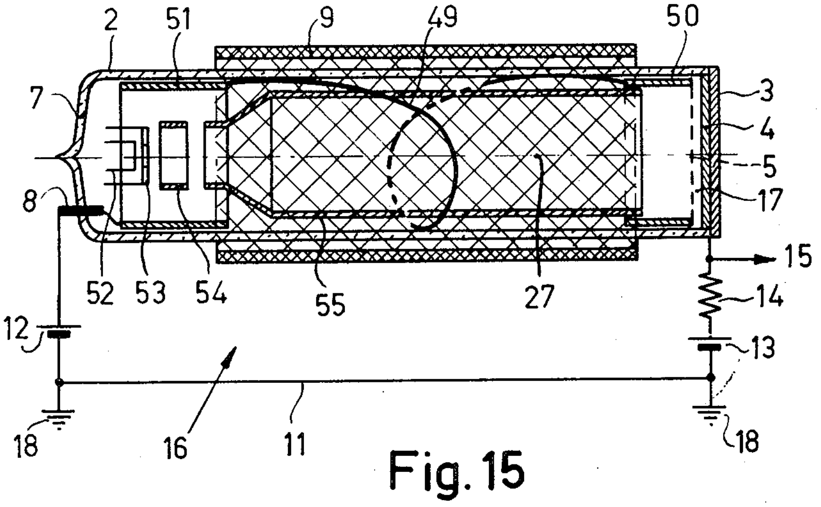

Some preferred embodiments according to the invention will be described hereinafter with reference to the drawing. In the drawing:

FIG. 1 is a diagrammatic representation of a television camera tube provided with a coil system, a ferromagnetic screening member and a mesh connection loop, FIGS. 2 and 3 are diagrammatic cross-sectional views of a television camera tube having a coil system, a screening member and a mesh connection loop according to the invention which differs in each television camera tube, FIG. 4 is a diagrammatic longitudinal sectional view of a television camera tube with preferred embodiments of two-wire connection conductors according to the invention, FIG. 5 is a diagrammatic view of the lines of force of a symmetrical four-pole field, FIG. 6 is a diagrammatic longitudinal sectional view of a television camera tube comprising a preferred embodiment of a single-wire connection conductor according to the invention, FIGS. 7 to 11 are perspective views of preferred embodiments according to the invention in which the mesh connection conductor comprises a mesh connection wire which is stepped in the deflection field, FIGS. 12 to 14 are perspective views of preferred embodiments according to the invention in which the mesh connection conductor comprises a helical connection wire, and FIG. 15 is a diagrammatic longitudinal sectional view of a television camera tube having a mesh connection conductor which consists partly of cylindrical bushings and partly of a helical wire.

The parts of a television camera which are relevent to this invention are diagrammatically shown in FIG. 1. Inside a cylindrical envelope 2 a television camera tube 1 comprises a target 4 which is preferably provided on an entrance window 3. The target can contain a photoconductive material such as antimony trisulphide or lead monoxide which is provided on the inner side of the window 3. The target can also consist of a disc of semiconductor material such as silicon which is mounted in the envelope and in which a mosaic of discrete p-n junctions is provided. A mesh electrode 5 is situated at a comparatively small distance, for example, a few millimetres, from and parallel to the target 4. *Via* a mesh connection conductor 6, the mesh electrode 5 is connected to a connection pin 8 which is moulded in a tube base 7. Also arranged in the television tube is an electron gun (not shown) for generating an electron beam by means of which the target can be scanned. Provided about the camera tube 1 is a coil system 9 which comprises coils for line deflection and field deflection (not separately shown). For this invention it is irrelevant whether the scanning electron beam is magnetically or electrostatically focussed. Provided about the coil system 9 is a ferromagnetic screening member 10 which is made, for example, of mu-metal. So as to supply the desired direct voltages to the mesh electrode and the target, a voltage source 12 for the mesh voltage and a voltage source 13 for the target voltage are incorporated in a mesh supply conductor 11. Besides the voltage sources 12 and 13, the mesh supply conductor 11 also comprises a signal resistor 14 from which a video signal can be derived *via* a terminal 15. The mesh connection conductor 6 and the mesh supply conductor 11 together form a galvanic connection loop 16 which has a capacitive interruption 17 between the mesh electrode 5 and the target 4.

As appears from FIG. 1, the mesh connection loop 16 encloses a wall portion of the screening member. In commonly used television cameras the camera mass forms part of the mesh supply conductor, which is denoted by ground signs 18. FIG. 1 also shows a shaded area 19 where an active line deflection field, represented by lines of force 20, can be generated. In the wall of the screening member 10 the line deflection field 20 changes over into a return field which is denoted by dots 21. The angular position of the mesh connection conductor 6 determines whether, and if so, to what degree, a magnetic flux of the line deflection field 20 of the return field 21 is enclosed by the mesh connection loop. Variations in the enclosed flux will cause voltages in the mesh connection loop. These voltages appear across the capacitive loop interruption 17.

A feasible method of eliminating the interference signals is to avoid magnetic induction as much as possible in the mesh connection loop by preventing the loop from enclosing lines of force 20 of the line deflection field or return lines 21. In a known construction this is realized by providing an electrically conductive glass passage on the window side of the camera tube in front of the mesh electrode. In that case there is no longer a mesh connection loop which encloses lines of force of the deflection field. However, an additional glass passage near the target where the electrostatic fields are very critical apparently obstructs the use of this construction.

According to the invention a construction can be proposed in which the flux enclosed by the mesh connection loop is comparatively small, without an additional glass passage being required on the window side. A preferred embodiment of this kind is shown in FIG. 2. The gauze supply conductor of this preferred embodiment comprises a mesh supply wire 22 which is situated inside the screening member, directly against the outer wall of the camera tube, and which extends from the tube window side to the tube base side where it is connected to the mesh connection conductor. A mesh connection wire 23 of the mesh connection conductor is arranged against the inner wall of the camera tube, as near to the mesh supply wire as possible and together therewith in a radial plane 24. A drawback of this construction is that the interference voltages, now caused only by the actual deflection field 20, are fully eliminated only if for the orientation $\phi$ in FIG. 2 $\phi = 0$ or $\phi = \pi$. The desired angular position of the camera tube in the deflection field is thus more or less determined thereby. A better solution in this respect is offered by a preferred embodiment according to the invention which is shown in FIG. 3. Therein, a mesh supply wire 25 which forms part of the mesh supply conductor is rigidly mounted in the coil system. On the window side this wire is connected to the voltage source 12 and is connected to the passage pin 8 on the tube base side. The desired minimum interference again determines the angular position of the camera tube in the deflection field, but in the orientation where the interference voltage is equal to zero, the derivative of the interference voltage to the orientation angle $\phi$ is also equal to zero. A mesh connection wire 26 which complements the mesh connection loop must then be arranged in a plane transverse to the lines of force 20 and must extend through an optical axis 27 of the system. The mesh supply wire 25 must then be arranged in a plane 28 parallel to the lines of force 20 through the mesh connection wire 26. The angular setting at which the interference voltage is zero is then less critical than in the said construction where a tube position with minimum interference voltage produces a maximum value of the derivative to $\phi$.

In a known construction (see, for example, U.S. Pat. No. 3,286,121 the gauze connection conductor is of the two-wire type. FIG. 4 is a diagrammatic representation of a two-wire construction in order to illustrate its operation on the basis of the present insight. The mesh connection conductor comprises two mesh connection wires 29 and 30 which are both connected to the electrically conductive mesh 5 and to a tube base pin 8 which is shown to be coincident with the axis 27 of the system. Consequently, the mesh connection wires form a mesh wire loop 31 which also extends over the area 19 where the deflection field is active. In conjunction with this mesh wire loop 31, the mesh supply conductor 11 constitutes the mesh connection loop 16. It can be demonstrated that, for any position of the mesh wire loop 31, an induction voltage which is generated in the loop formed by the mesh supply conductor 11 and the mesh connection wire 30 is compensated for by a half induction voltage generated in the mesh wire loop 31. No interference voltage will then appear across the interruption 17 between the mesh and the target. However, the said compensation will generally be accompanied by a current induced in the mesh wire loop 31. In practical cases this current can reach a comparatively high value, for example, up to some hundreds of mA. A current flowing through the mesh connection wires 29 and 30 generates a magnetic field about the wires which can have a disturbing effect on the scanning. This is one of the causes of the drawbacks of this construction described in the introductory paragraph. Knowing the cause, this drawback can be eliminated according to the invention by increasing the electrical resistance of the mesh wire loop 31, for example, from 0.5 ohms to 100 ohms. So as to retain proper compensation, an identical resistor must be incorporated in both wires. For example, the resistors 32 and 33 which are denoted by broken lines in FIG. 3 can be incorporated in the wires. Alternatively, each of the wires can be individually connected to a passage pin and between these passage pins, outside the camera tube, a resistor 34 which is also denoted by broken lines can be connected.

By constructing an electrical contact 35 as a potentiometer wiper and by connecting it to the gauze supply conductor, external residual interference correction becomes possible. Such a residual interference correction construction can be advantageous, for example, if wires of the mesh connection conductor are not symmetrically arranged in the camera tube. A resultant imbalance in the compensation can cancel the complete suppression of the interference signal originating from the primary line deflection field. Electrical balancing can then be realized by means of the potentiometer.

The primary line deflection field for the line deflection in a television camera is formed by a symmetrical two-pole field. Commonly used coil systems, however, often also appear to generate a four-pole field. Often the appearance thereof cannot be avoided without adversely influencing desired properties of the coil system. Also known are coil systems, for example, for deflection amplification, in which the desired main deflection field is a four-pole field. FIG. 5 shows lines of force 36 of a four-pole field. Interference fields of a higher order yet, such as eight-pole fields, also occur in coil systems for scanning the target of a television camera tube. For an arbitrary orientation angle $\phi$, a gauze wire loop 31 will not be effective against interference signals caused by such higher-order fields. As will yet be demonstrated, a simple preferred embodiment according to the invention is also effective against higher-order interference fields.

Figures 7, 8, 9:
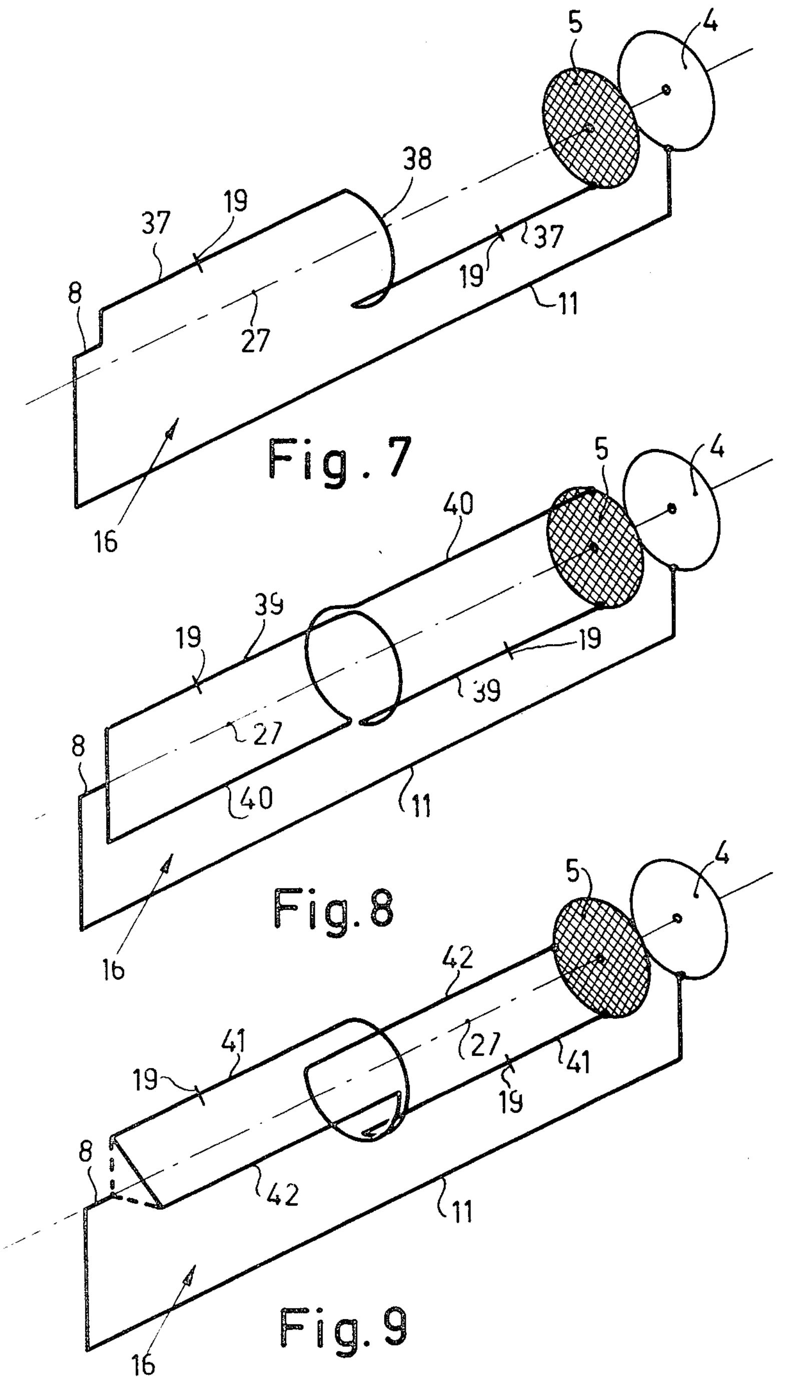

A preferred embodiment which is effective only for two-pole fields is shown in FIG. 6 and comprises a gauze connection wire 37 which, axially viewed, has a symmetrical step 38 halfway the area 19 where the line deflection field is active. FIG. 7 is a perspective view of the mesh connection wire 37. The axial limits of the area 19 are denoted by strokes 19 on the wire. In this preferred embodiment the interference voltage caused by the two-pole line deflection field is suppressed for any angular position, without currents disturbing the scanning flowing in the mesh connection wire 37. The suppression of the interference voltage is due to the fact that the mesh connection loop does not enclose any resultant flux for any angular position in the line deflection field. This is because the flux enclosed by the line deflection field is always compensated for by the return flux which is concentrated in the screening bush wall. Upon rotation, the flux in the part of the loop between the tube base and the step 38, for example, increases by an amount equal to the amount by which the flux in the part of the loop between the step 38 and the tube window decreases. Consequently, this construction is sensitive to angular displacement of the camera tube in the coil system.

It will be obvious from the foregoing that this preferred embodiment is sensitive to axial displacement of the camera tube in the coil system. This is because the step 38 is then shifted in the field. Because practical coil systems produce a properly defined field and because the axial position of the camera tube therein is not very critical as regards otehr properties, this axial sensitivity can also be considered as an advantage. This is because a slight axial displacement can again produce a residual correction of any asymmetry in the arrangement of the gauze connection wire 37. This preferred embodiment again is not effective against interference signals caused by fields with higher-order poles.

The construction shown in FIGS. 6 and 7 can be rendered insensitive to axial displacement by means of a double construction of the mesh connection conductor. This construction is shown in perspective in FIG. 8. In the case of an axial displacement of the camera tube in the deflection field, an induction current will be generated in each of the wires 39 and 40. However, the circumstances remaining the same, the induction current then occurring is one order lower than the induction current occurring in the known double-wire connection. In addition, the induction current is oppositely directed, axially viewed, for two substantially equal field length parts. As a result, any disturbing deflection of the electron beam is also oppositely directed for the two parts, so that another compensating action is obtained. The double construction of the mesh connection wire does not affect the influence of fields with higher-order poles on each of the mesh connection wires, so that this preferred embodiment again is not effective there against.

Suppression of interference signals originating from symmetrical four-pole fields is achieved by means of a preferred embodiment which is diagrammatically shown in perspective in FIG. 9. This preferred embodiment comprises two mesh connection wires 41 and 42. Each of these wires has an angular 180°-step in the field center. The wires are mounted in the camera tube such that they are shifted over an angle of 90° with respect to each other. The interference voltage originating from the two-pole field is suppressed for each wire individually by the angular 180°-step in the field centre. As a result, induction currents no longer occur in the wires. Suppression of interference signals originating from symmetrical four-pole fields can now be accompanied by a, be it comparatively small, current through the wires.

FIG. 10 is a perspective view of a preferred embodiment according to the invention by means of which interference originating from a symmetrical four-pole field is suppressed without induction currents being generated. To this end, a single mesh connection wire 43 is provided with a 90°-step 44 in the field center. This construction is not effective for two-pole fields. Analogous to the construction shown in FIG. 7 for two-pole fields, no induction current originating from the four-pole field occurs in the wire 43. Once more analogous to the single wire having a 180°-step for the two-pole field, the construction is sensitive to axial displacement, but insensitive to the angular position of the mesh connection wire. Analogous to the preferred embodiment shown in FIG. 8, the preferred embodiment according to FIG. 10 can be rendered insensitive to axial displacement by using two connection wires which succeed each other at one fourth of the circumference and which each have a 90°-step in the field center.

In a further preferred embodiment according to the invention, the mesh connection conductor consists of 3 straight wires which are mounted in the tube at an angular distance of 120° with respect to each other. Thereby, all interference signals originating from two-pole, four-pole, eight-pole fields etc. are suppressed, independent of the angular tube position. When the tube is in operation, a current will flow in the three wires which causes a slight disturbance of the deflection field. This drawback can be eliminated by using, like in the foregoing, a single gauze connection wire which has a 120°-step at one-third and at two-thirds of the active field length of the deflection field, so in total 240°C.

The sensitivity of this construction to axial displacement of the tube in the deflection field can be counteracted by using two wires having two steps each. These two wires are preferably mounted in the tube such that they are rotated through 180° with respect to each other. The latter construction also suppresses interference fields originating from six-pole fields and higher harmonics thereof.

Non-symmetrical four-pole fields are also found to occur in practical television cameras. An analysis of these fields has demonstrated that these fields can be considered approximately as a superimposition of a symmetrical four-pole field and a symmetrical eight-pole field. Consequently, for suppressing interference signals appearing in such television cameras also interference voltages originating from symmetrical eight-pole fields will have to be suppressed.

Analogous to the step from the two-pole field to the four-pole field, a construction is obtained consisting of four mesh connection wires, each of which has a 180°-step in the field centre, the wires being mounted in the camera tube such that each wire is shifted 45°. This construction is sensitive to axial displacement. Continuing this line of thought, interference signals originating from fields having poles up to and including the $n^{th}$ order can be suppressed by using ½ $n$ wires, each of which has a 180°-step in the field center, the wires succeeding each other over an angle of 360° divided by $n$.

However, this does not result in a very practical construction.

However, it is also possible to follow a line of thought which, as will be demonstrated, leads to more practical solutions. It was already demonstrated that interference voltages caused by a two-pole field can be suppressed by means of a mesh connection wire which has a 180°-step in the field centre. According to the same line of thought and considering the solution given in FIG. 7, interference caused by two-pole fields and interference caused by four-pole fields can be suppressed by means of a mesh connection wire which divides the length of the active line deflection field, measured in the axial direction, into four equal pieces by means of three steps of 90° each. The gauze connection wire is then subjected to an angular shift of 270°. FIG. 11 shows this construction with a mesh connection wire 45. Similarly, interference signals originating from fields having poles up to and including the $8^{th}$ order are suppressed by means of a mesh connection wire which divides the length of the line deflection field, measured in the axial direction, into 8 equal pieces by means of seven steps of 360° divided by 8, so 45° each. As a result of the seven steps, the wire has an angular shift of 315°. Continuation of this line of thought for $n$ to infinite results in a gauze connection wire 46 as shown in FIG. 12 which describes a helix over the axial field length, the pitch of said helix being equal to the axial field length. This preferred embodiment offers a practical solution for suppressing all interference voltages caused by the line deflection field. Consequently, by means of this preferred embodiment interference signals originating from higher-order interference fields caused by the line deflection field are also suppressed. The wire 46 can be arranged against the inner side of the envelope of the camera tube. These single-wire solutions are insensitive to the angular position of the gauze connection wire in the deflection field, but are sensitive to axial displacement. This axial sensitivity can be eliminated for the better part by incorporating, for example, diametrically, a similar wire construction in the camera tube. The preferred embodiment incorporating the helical wire can in principal be rendered fully insensitive to axial displacement by continuing the helix of the single wire on both sides of the deflection field. This preferred embodiment, comprising a mesh connection wire 47 in the form of a helix which also extends outside the area where the deflection field is active, is shown in FIG. 13. In the case of axial displacement, a 360° helical wire is then always present in the deflection field, the said helical wire suppressing all interference voltages. In practical coil systems the deflection field has an axial length, for example, of 96 mm. In that case the helix must preferably have a pitch of approximately 96 mm. Further considerations reveal that a mesh connection wire 48, shown in FIG. 14 and having a pitch which is a sub-multiple of the length of the line deflection field, also suppresses all interference voltages. The latter two constructions can both be corrected for the better part as regards deviations in the value of the pitch with respect to the field length by adding an identical helical wire which is mounted in the camera tube at an angle of 180° with respect to the first wire.

If the pitch in one of the above preferred embodiments incorporating a helical wire is not optimally adapted to the axial length of the deflection field, residual interference occurs as a result of four-pole fields for which the addition of a plurality of corresponding helical wires does not offer a solution. In a preferred embodiment this residual interference is compensated for for the better part by the use of two helical wires which extend in the opposite sense of rotation between a common starting point and a common end point. If necessary, a plurality of such pairs of helical wires can be incoroporated in a television camera tube, the said pairs having to be uniformly distributed over the circumference, for example, two diametrically arranged pairs.

In many television camera tubes the mesh electrode is constructed more or less in the form of a bushings as shown in FIG. 15. A mesh connection wire 49, again having the shape of a helix, is connected to this bushings 50 in a preferred embodiment according to the invention. A further electrically conductive bushings 51 is mounted in the camera tube 1 on the tube base side. This bushings is connected to the passage pin 8 and is mounted about an electron gun comprising a cathode 52, a control electrode 53, a first anode 54 and an acceleration anode 55. The distance between the ends of the bushings which face each other is chosen to be such that the line deflection field is properly homogeneous between the bushings. The bushes 50 and 51 then extend over the decayed areas of the deflection field which always appear on the axial ends thereof. Because these bushings act as fictitious connection wires which coincide with the optical axis of the system, irregularities in the decayed fields cannot cause interference. After completion of a 360° helix or an integer multiple of 360°, the mesh connection wire 49 is connected to the bushing 51 as shown in perspective in FIG. 15. This preferred embodiment is in principle insensitive to the angular position of the camera tube and insensitive to axial displacement. An advantage of this preferred embodiment is that differences in the deflection fields of different coil systems have no adverse effects. Instead of the mesh connection wire 49, a plurality of mesh connection wires can again be used, In a further preferred embodiment according to the invention (not shown) the mesh connection conductor comprises a plurality of mesh connection wires, preferably three, which extend straight between the tube base and the mesh electrode and which are homogeneously distributed over the circumference of the camera tube, but which do not form pairs of diametrically arranged wires. When use is made of three wires, these wires succeed each other over each time an angle of 120°, measured along the circumference of the camera tube. This preferred embodiment is effective against interference fields caused by all higher-order fields occurring in television cameras and is insensitive to the angular position and to axial displacement of the camera tube in the deflection field. It is obvious that these mesh connection wires can again be provided between the bushes 50 and 51 as shown in FIG. 15.

What is claimed is:

1. A television camera comprising a television camera tube having an envelope with a target to be scanned by an electron beam therein and a mesh electrode positioned in proximity to the target, means to produce a line deflection field for scanning said target line-wise with said electron beam, and means to apply a direct voltage between the mesh electrode and the target, said latter means comprising a conductor within the tube envelope and a conductor external to the tube envelope, said conductors being connected to said mesh electrode and forming a loop having a configuration which avoids the appearance of interference voltages, caused by the line deflection field, between the mesh electrode and the target and prevents the appearance of disturbing induction currents in the conductor within the tube envelope.

2. A television camera as claimed in claim 1, wherein the conductor within the tube envelope comprises a wire having a 180°-step at the area of the center, axially measured, of the line deflection field.

3. A television camera as claimed in claim 2, wherein the conductor within the tube envelope comprises two wires which are mounted within the tube envelope at an angle of 180° with respect to each other, each wire having a 180°-step at the area of the field center.

4. A television camera as claimed in claim 2, wherein the conductor within the tube envelope comprises two wires, each of which has a 180°-step at the area of the field center, the wires being mounted within the tube envelope at an angle of 90° with respect to each other.

5. A television camera as claimed in claim 1, wherein the conductor within the tube envelope comprises a wire having three steps of 90° each which divide the axially measured length of the line deflection field into four equal parts.

6. A television camera tube as claimed in claim 2, wherein the conductor within the tube envelope comprises a wire having $n-1$ steps of $360°/n$ which divide the axially measured field length into $n$ equal pieces.

7. A television camera as claimed in claim 2, wherein the conductor within the tube envelope comprises a wire describing helix of 360° over the axially measured length of the line deflection field.

8. A television camera as claimed in claim 7, wherein the helical wire extends in the axial direction outside the area where the line deflection field is active.

9. A television camera as claimed in claim 7 wherein the conductor within the tube envelope comprises a helical wire having a pitch which is a sub-multiple of the axially but an field length.

10. A television camera as claimed in claim 7 wherein the conductor within the tube envelope comprises two helical wires having a common starting point and a common end point, butan opposed sense of rotation.

11. A television camera as claimed in claim 1 wherein the conductor within the tube envelope comprises a bushing which is connected to a tube base pin, a wire and a bushing which is connected to the mesh electrode, the bushings being arranged in the tube envelope at a mutual distance, viewed axially, of at the most the length of the area where the line deflection field is effective, the wire within the tube envelope forming a helix of 360° or an integral multiple of 360° between the bushings.

12. A television camera as claimed in claim 2 wherein the conductor within the tube envelope comprises a second wire extending in like manner to the first-mentioned wire and which is mounted in the tube envelope at an angle of 180° with respect thereto.

13. A television camera as claimed in claim 1, wherein the conductor within the tube envelope comprises at least three straight wires which are mounted at mutually equal distances, measured over the circumference of the tube envelope, without forming pairs of diametrically arranged wires.

14. A television camera as claimed in claim 1, wherein the loop comprises a wire within the envelope, both wires being arranged against the tube wall in a symmetry plane of the line deflection field at an as small as possible distance from each other, the wires being galvanically connected to each other on the tube base side, and making galvanic contact in the said sequence with the mesh electrode and a voltage source for the mesh electrode.

15. A television camera as claimed in claim 1 wherein the loop comprises, in addition to a wire within the tube envelope, a wire external to the tube envelope and which is axially mounted in a coil system for deflecting the electron beam, said wire external to the tube envelope being galvanically connected to the wire within the tube envelope at the base thereof and is galvanically connected to a voltage source on the tube window side, the wire within the tube envelope being situated in a plane which contains the axis of the system and which is transverse to the symmetry plane of the line deflection field, the wire external to the tube being situated in a plane which extends parallel to the line deflection field lines and through the wire within the tube.

16. A television camera as claimed in claim 1, wherein the conductor within the tube comprises two wires which are diametrically arranged in the tube envelope, an identical resistor being incorporated in each of these wires.

17. A television camera as claimed in claim 1, wherein the conductor within the tube envelope comprises two wires which are diametrically arranged within the tube envelope, each wire being connected to a passage pin in the tube base, the said tube base pins being connected, outside the camera tube, to a potentiometer resistor, one end of the gauze supply conductor being connected to the potentiometer resistor *via* a potentiometer wiper.

* * * * *

PO-1050
(5/69)

UNITED STATES PATENT OFFICE
CERTIFICATE OF CORRECTION

Patent No. 3,811,066 Dated May 14, 1974

Inventor(s) BENEDICTUS T.J. HOLMAN

It is certified that error appears in the above-identified patent and that said Letters Patent are hereby corrected as shown below:

Column 1, line 11 before "elec-" insert --mesh--;

line 12, cancel "mesh";

Column 4, line 63, after "3,286,121" insert --)--;

Column 6, line 29, after "regards" "otehr" should read --other--;

Column 9, line 26, "bushes" should read --bushings--;

Claim 9, line 4, "but an" should read --measured--;

Claim 10, line 4, "butan" should read --but an--.

Signed and sealed this 8th day of October 1974.

(SEAL)
Attest:

McCOY M. GIBSON JR.
Attesting Officer

C. MARSHALL DANN
Commissioner of Patents